(12) United States Patent
Hassan et al.

(10) Patent No.: US 9,031,042 B2
(45) Date of Patent: *May 12, 2015

(54) ADAPTING A COMMUNICATION NETWORK TO VARYING CONDITIONS

(71) Applicant: Microsoft Corporation, Redmond, WA (US)

(72) Inventors: Amer A. Hassan, Kirkland, WA (US); Christian Huitema, Clyde Hill, WA (US); Thomas Kuehnel, Seattle, WA (US); Vishesh M. Parikh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,636

(22) Filed: Feb. 25, 2013

(65) Prior Publication Data

US 2013/0170380 A1 Jul. 4, 2013

Related U.S. Application Data

(63) Continuation of application No. 11/268,800, filed on Nov. 8, 2005, now Pat. No. 8,396,041.

(51) Int. Cl.
*H04W 4/00* (2009.01)
*H04J 3/16* (2006.01)
(Continued)

(52) U.S. Cl.
CPC ............ *H04W 36/06* (2013.01); *H04L 1/0025* (2013.01); *H04L 1/22* (2013.01); *H04W 48/18* (2013.01); *H04W 88/06* (2013.01); *H04W 88/10* (2013.01)

(58) Field of Classification Search
CPC ..... H04W 36/06; H04W 36/24; H04W 36/26; H04W 36/30; H04W 36/245
USPC ......................... 370/328–334, 339, 464–473; 455/435.2, 552.1, 436–444, 553.1
See application file for complete search history.

(56) References Cited

U.S. PATENT DOCUMENTS 5,388,211 A 2/1995 Hornbuckle
5,436,906 A 7/1995 Kasuya
(Continued)

FOREIGN PATENT DOCUMENTS

DE 19538124 A1 4/1997
EP 1267586 12/2002
(Continued)

OTHER PUBLICATIONS

International Search Report from Application No. PCT/US2006/043655, Mar. 23, 2007.
(Continued)

*Primary Examiner* — Habte Mered
(74) *Attorney, Agent, or Firm* — John Jardine; Kate Drakos; Micky Minhas

(57) ABSTRACT

Systems and methods are disclosed for adapting a communication system to varying conditions. Using some form of discovery protocol, the communication standards supported by at least two communicants are determined. Each communicant may then periodically monitor the quality of the channel established by the communication standard and dynamically select a set of one or more communication standards to use for communicating. Further, when communicants share common non-standard parameterized implementations of communication standards, changes to the protocols which the communication standards comprise can be used to add options for a more dynamic response to changing conditions than is possible when adhering only to an established communication standard.

20 Claims, 4 Drawing Sheets

(51) Int. Cl.

| | | |
|---|---|---|
| H04J 3/22 | (2006.01) | |
| H04W 36/00 | (2009.01) | |
| H04W 36/06 | (2009.01) | |
| H04L 1/00 | (2006.01) | |
| H04L 1/22 | (2006.01) | |
| H04W 48/18 | (2009.01) | |
| H04W 88/06 | (2009.01) | |
| H04W 88/10 | (2009.01) | |

(56) References Cited

U.S. PATENT DOCUMENTS

| | | | |
|---|---|---|---|
| 5,553,083 | A | 9/1996 | Miller |
| 5,600,663 | A | 2/1997 | Ayanoglu |
| 5,839,061 | A | 11/1998 | Hendrickson et al. |
| 5,867,538 | A | 2/1999 | Liu |
| 5,870,666 | A | 2/1999 | Tanaka et al. |
| 5,907,563 | A | 5/1999 | Takeuchi |
| 6,035,183 | A | 3/2000 | Todd et al. |
| 6,052,600 | A | 4/2000 | Fette |
| 6,067,575 | A | 5/2000 | McManis |
| 6,073,214 | A | 6/2000 | Fawcett |
| 6,105,068 | A | 8/2000 | Naudus |
| 6,182,264 | B1 | 1/2001 | Ott |
| 6,282,709 | B1 | 8/2001 | Reha |
| 6,327,312 | B1 | 12/2001 | Jovanovich et al. |
| 6,360,077 | B2 | 3/2002 | Mizoguchi |
| 6,378,126 | B2 | 4/2002 | Tang |
| 6,381,742 | B2 | 4/2002 | Forbes |
| 6,430,738 | B1 | 8/2002 | Gross |
| 6,591,382 | B1 | 7/2003 | Molloy |
| 6,769,046 | B2 | 7/2004 | Adams |
| 6,788,959 | B2 * | 9/2004 | Jokinen et al. ............. 455/552.1 |
| 6,823,181 | B1 | 11/2004 | Kohno et al. |
| 6,891,858 | B1 | 5/2005 | Mahesh |
| 6,931,578 | B1 | 8/2005 | Gill |
| 6,937,877 | B2 | 8/2005 | Davenport |
| 6,967,930 | B2 | 11/2005 | Burmeister |
| 7,069,045 | B2 | 6/2006 | Wu |
| 7,111,249 | B2 | 9/2006 | Kenyon |
| 7,149,948 | B2 | 12/2006 | Davis |
| 7,151,925 | B2 | 12/2006 | Ting |
| 7,164,912 | B2 | 1/2007 | Buckley et al. ............. 455/435.2 |
| 7,181,218 | B2 * | 2/2007 | Ovesjo et al. ................. 455/436 |
| 7,218,645 | B2 | 5/2007 | Lotter et al. ................... 370/469 |
| 7,260,369 | B2 | 8/2007 | Feher ............................ 455/133 |
| 7,283,838 | B2 | 10/2007 | Lu |
| 7,319,870 | B2 | 1/2008 | Olson |
| 7,376,721 | B2 | 5/2008 | Braun |
| 7,404,074 | B2 | 7/2008 | Murotake |
| 7,433,707 | B2 * | 10/2008 | Kaminski et al. .......... 455/552.1 |
| 7,496,739 | B1 | 2/2009 | Raghavan |
| 7,681,239 | B2 | 3/2010 | Hassan |
| 7,784,028 | B2 | 8/2010 | Luo |
| 7,784,029 | B2 | 8/2010 | Hassan |
| 8,346,900 | B2 | 1/2013 | Hassan |
| 8,381,047 | B2 | 2/2013 | Hassan |
| 8,396,041 | B2 | 3/2013 | Hassan |
| 2002/0083360 | A1 | 6/2002 | Popplewell et al. |
| 2002/0083432 | A1 | 6/2002 | Souissi |
| 2002/0091702 | A1 | 7/2002 | Mullins |
| 2002/0138796 | A1 | 9/2002 | Jacob |
| 2002/0144134 | A1 | 10/2002 | Watanabe |
| 2002/0165986 | A1 | 11/2002 | Tarnoff |
| 2002/0173271 | A1 | 11/2002 | Blair |
| 2002/0178417 | A1 | 11/2002 | Jacob |
| 2003/0003937 | A1 | 1/2003 | Ohkubo et al. |
| 2003/0039214 | A1 | 2/2003 | Huffman |
| 2003/0050055 | A1 | 3/2003 | Ting et al. ..................... 455/419 |
| 2003/0097623 | A1 | 5/2003 | Razavilar et al. ............. 714/704 |
| 2003/0100308 | A1 | 5/2003 | Rusch |
| 2003/0120583 | A1 | 6/2003 | Olson |
| 2003/0133435 | A1 * | 7/2003 | Friedrich ...................... 370/349 |
| 2003/0214417 | A1 | 11/2003 | Peltz |
| 2003/0216927 | A1 | 11/2003 | Sridhar |
| 2003/0219034 | A1 | 11/2003 | Lotter ........................ 455/435.2 |
| 2004/0029575 | A1 | 2/2004 | Mehta |
| 2004/0034853 | A1 | 2/2004 | Gibbons |
| 2004/0048608 | A1 | 3/2004 | Matsuo |
| 2004/0052252 | A1 | 3/2004 | Karaoguz et al. ............. 370/389 |
| 2004/0063425 | A1 | 4/2004 | Wakutsu |
| 2004/0073801 | A1 | 4/2004 | Kalogridis |
| 2004/0073901 | A1 | 4/2004 | Imamatsu |
| 2004/0098715 | A1 | 5/2004 | Aghera |
| 2004/0117623 | A1 | 6/2004 | Kalogridis |
| 2004/0242261 | A1 | 12/2004 | Fette |
| 2004/0246001 | A1 | 12/2004 | Sontag et al. |
| 2005/0007988 | A1 | 1/2005 | Ferris |
| 2005/0027789 | A1 | 2/2005 | Luo |
| 2005/0055689 | A1 | 3/2005 | Abfalter |
| 2005/0059427 | A1 | 3/2005 | Wallace |
| 2005/0079842 | A1 | 4/2005 | Shi |
| 2005/0081220 | A1 | 4/2005 | Yodaiken |
| 2005/0108382 | A1 | 5/2005 | Murotake |
| 2005/0174981 | A1 | 8/2005 | Heath |
| 2005/0190827 | A1 | 9/2005 | Xu |
| 2005/0227692 | A1 * | 10/2005 | Kawashima et al. ....... 455/435.2 |
| 2005/0251725 | A1 | 11/2005 | Huang |
| 2006/0084475 | A1 | 4/2006 | Ohkubo et al. |
| 2006/0265706 | A1 | 11/2006 | Isaacson |
| 2007/0077903 | A1 | 4/2007 | Hassan |
| 2007/0077952 | A1 * | 4/2007 | Sartori et al. .................. 455/515 |
| 2007/0078924 | A1 | 4/2007 | Hassan |
| 2007/0104218 | A1 | 5/2007 | Hassan |
| 2009/0270113 | A1 * | 10/2009 | Feher ......................... 455/456.1 |
| 2012/0026974 | A1 * | 2/2012 | Fong ............................ 370/331 |
| 2013/0139011 | A1 | 5/2013 | Hassan |

FOREIGN PATENT DOCUMENTS

| | | |
|---|---|---|
| EP | 1289181 | 3/2003 |
| GB | 2 350 749 A | 12/2000 |
| GB | 2399999 | 9/2004 |
| JP | 06-244791 | 9/1994 |
| JP | 2001-230809 | 8/2001 |
| JP | 2003-087858 A | 3/2003 |
| JP | 2003-298559 | 10/2003 |
| JP | 2004-253828 | 9/2004 |
| JP | 2005-122699 A | 5/2005 |
| JP | 2006-109397 A | 4/2006 |
| JP | 2006-309533 A | 11/2006 |
| WO | 02/37222 A2 | 5/2002 |
| WO | 03/028228 A2 | 4/2003 |
| WO | WO 03/071813 | 8/2003 |
| WO | 2004/008719 A2 | 1/2004 |
| WO | WO 2004/042982 | 5/2004 |
| WO | WO 2005/036809 | 4/2005 |
| WO | WO 2007/056467 | 5/2007 |
| WO | WO 2007/064455 | 6/2007 |

OTHER PUBLICATIONS

CN First Office Action from Application No. 200680041463.6, Mar. 13, 2009.

CN Notice on the First Office Action from Application No. 200680044639.3, Feb. 22, 2011.

JP Notice of Rejection from Application No. 2008-543302, Nov. 30, 2011.

International Search Report, for Application No. PCT/US2006/043511, Mar. 28, 2007.

International Search Report, for Application No. PCT/US2006/24419, Mar. 21, 2007.

G. D. Forney, "The Viterbi Algorithm", Mar. 1973, Proceedings of the IEEE, vol. 61, No. 3, pp. 268-278.

KR Notice of Preliminary Rejection for Application No. 10-2008-7011099, Nov. 20, 2012.

KR Notice of Preliminary Rejection for Application No. 2008-7013184, Sep. 28, 2012.

EP Supplementary Search Report, for Application No. 06837250.7-1237 / 1955468 PCT/US2006043655, Jun. 1, 2012.

European search report from corresponding European patent application No. 06837169.9 dated Feb. 28, 2011.

(56) References Cited

OTHER PUBLICATIONS

International Search Report from corresponding International Application No. PCT/US2006/043511, filed Nov. 8, 2006.
Wireless Personal Communications; Abstract May 2000. http://www.springerlink.com/app/home/contribution.asp?wasp=6cd98a3e17b74e0e965db7c159389506&referrer=parent&backto=issue,9,12;journal,62,87;linkingpublicatonresults,1:100345,1.
Wiley InterScience; Research Article Software Radio—a key technology for adaptive access;Online Abstract; http://www3.interscience.wiley.com/cgi-bin/abstracts/101526373/ABSTRACT Dec. 23, 2002.
Forward error correcting for CDMA systems; Abstract; Sep. 1996 http://ieeexplore.ieee.org/xpl/abs_free.jsp?arNumber=563190.
EP Communication for Appiication No. 06837169.9-1852, Feb. 7, 2014.
EP Communication for Application No. 06 837 250.7-1851, Reference FB20059, Apr. 10, 2013.
JP Notice of Rejection for Applicaion No. 2008-543302, Jan. 22, 2013.
Ashcraft, "Using Programmer-Written Compiler Extensions to Catch Security Holes", Proceedings of the 2002 IEEE Symposium on Security and Privacy (S&P'02), May 12-15, 2002.
Balfanz, "Usable Access Control for the World Wide Web", Proceedings of the 19th Annual Computer Security Applications Conference (ACSAC 2003), Dec. 8-12, 2003.
Hoflehner, "The compiler as a validation and evaluation tool", Compiler Optimization Meets Compiler Verification (COCV'03), Published by Elsevier Science B. V., Apr. 12, 2003.
Mitola III, "SDR Architecture Refinement for JTRS", Proceedings of the 21st Century Military Communications Conference (MILCOM 2000), Oct. 22-25, 2000.
Mitola III, "Cognitive Radio: An Integrated Agent Architecture for Software Defined Radio", May 8, 2000.
Mohebbi, "A Case Study of Mapping a Software-Defined Radio (SDR) Application on a Reconfigurable DSP Core", Proceedings of the 1st IEEE/ACM/IFIP International Conference on Hardware/Software Codesign and System Synthesis, (CODES+ISSS 2003), Oct. 1-3, 2003.
SDR forum, "Report on Issues and Activity in the Area of Security for Software Defined Radio", Sep. 1, 2002.
International Telecommunication Union, "Information and Proposed Actions Relative to ITU-R Document on Software Defined Radio", Software Defined Radio Forum, Radiocommunication Study Groups, Mar. 16, 2003.
General Dynamics, C4 Systems, "Digital Modular Radio (DMR): Overview", Printed on Sep. 29, 2005.
WiNRADiO, "PC Radios Rule", Printed on Sep. 29, 2005.
Glossner, "Wireless SDR Solutions: The Challenge and Promise of Next Generation Handsets", Published at the Communications Design Conference, Nov. 2002.
PCT International Search Report and Written Opinion for Application No. PCT/US2006/038517, Reference 313971.12WO, Feb. 15, 2007.
PCT International Preliminary Report on Patentability for Application No. PCT/US2006/038517, Apr. 10, 2008.
Falk, "Approaches for Secure SDR Software Download", In Proceedings of the Software Defined Radio Forum Technical Conference (SDR 2004), Nov. 15-18, 2004.
Carpenter, "Software Defined Radio Test Bed for Integrated Communications and Navigation Applications", In Proceedings of the Software Defined Radio Forum Technical Conference (SDR 2004), Nov. 15-18, 2004.
Polson, "Cognitive Radio Applications in Software Defined Radio", In Proceedings of the Software Defined Radio Forum Technical Conference (SDR 2004), Nov. 15-18, 2004.
Nakajima, "Research and Developments of Software-Defined Radio Technologies in Japan", IEEE Communications Magazine, Aug. 2001.
Foka, "Software Defined Radio", May 2002.
PCT International Search Report and Written Opinion for Application No. PCT/US2006/038338, Reference 314496.07WO, Feb. 21, 2007.
CN First Office Action for Application No. 200680036379.5, Jun. 26, 2009.
EP Communication for Application No. 06815961.5-1244/1934787 PCT/US2006038338, Reference FB19883, Feb. 13, 2012.
JP Notice of Rejection for Application No. 2008-533733, Feb. 8, 2012.
KR Notice of Preliminary Rejection for Application No. 10-2008-7007659, Reference 314496.11, May 29, 2013.
CN Notice on the Second Office Action for Application No. 200680041463.6, Oct. 19, 2010.
CN Notice on the Third Office Action for Application No. 200680041463.6, Jan. 18, 2012.
CN Notice on the Fourth Office Action for Application No. 200680041463.6, Jun. 5, 2012.
CN Notice on the First Office Action for Application No. 200680044639.3, Feb. 22, 2011.
CN Notice on the Second Office Action for Application No. 200680044639.3, Jul. 2, 2012.
CN Notice on the Third Office Action for Application No. 200680044639.3, Sep. 21, 2012.

\* cited by examiner

ADAPTING A COMMUNICATION NETWORK TO VARYING CONDITIONS

RELATED APPLICATIONS

This application is a continuation of and claims benefit from U.S. patent application Ser. No. 11/268,800 that was filed on Nov. 8, 2005, and that is incorporated herein by reference in its entirety.

BACKGROUND

In the area of communication networks, substantial resources are committed to designing communication standards (i.e., sets of protocols for performing acts such as representing data, signaling, authenticating, and detecting errors, which are required to send information over a communication channel). These standards are generally engineered with a particular set of emerging applications in mind, and are optimized to perform well under a relatively narrow range of conditions (e.g., distance, interference, etc.). Often, trade-offs are made in the design of a standard in order to minimize the cost of implementing the standard within commodity hardware devices and minimize the number of variants of the standard to ensure device compatibility. Such trade-offs usually have the effect of further limiting the range of conditions within which a given standard is applicable.

The challenges mentioned above are commonly faced by consortia of manufacturers and other organizations endeavoring to design useful communication standards. The result is a rich landscape of standards, each of which is typically applicable only in relatively narrow conditions as needed by a particular set of applications. Though a large set of standards have now been developed, new ones are constantly being introduced. While some standards are improvements over older versions, justified by a rapid decrease in hardware cost, others are developed to support entirely new emerging applications.

It is likely that a trend will continue to emerge toward the development of a greater quantity of specialized, narrowly applicable communication standards. While such a trend does produce a great number of established standards from which a manufacturer wishing to develop a communication device might choose, it also increases the number of standards that infrastructure devices (e.g., communication servers, wireless access points, etc.) must simultaneously support without necessarily doing anything to improve the device's operational range and ability to adapt to varying conditions.

SUMMARY

Methods for adapting a communication network to varying conditions are disclosed. When communicants share in common one, or especially multiple, implementations of communication standards, a connection selector component in each of the communicants is used to monitor the quality of one or more of the communication channels established between the communicants. If the component determines a more efficient usage of the available communication standards that will meet the communication requirements of the communicants, an update is sent to the other communicants and a new set of communication standards is used.

Additionally, when (possibly non-standard) parameterized implementations of the communication standards are supported by each communicant, the connection selector component can also specify, and broadcast to the other communicants, a new set of parameters to be used by the communicants, allowing for a broader dynamic response to varying conditions than is possible without such parameterization.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
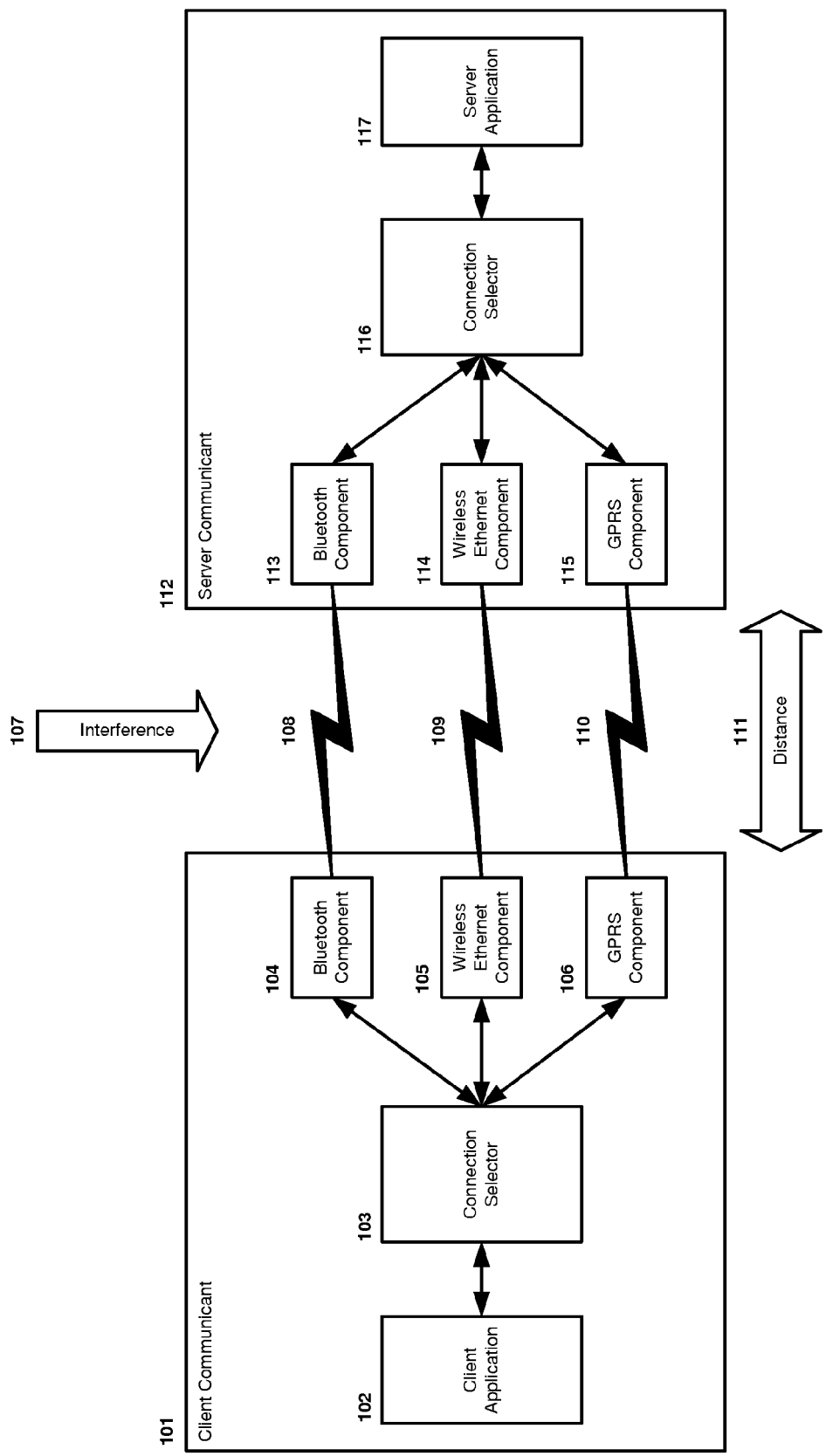
FIG. 1 shows an example of a system having two communicants in direct communication with each other, according to some aspects of the present invention.

A need has been recognized for systems and methods for adapting a communication network to varying conditions. Communication standards are typically engineered to operate efficiently within a narrow range of conditions. Decreases in the cost and size of semiconductors, along with major increases in their computation power have led to a new generation of powerful, portable computing devices. Driven by a strong trend toward distributed, networked applications, made possible by the success of the Internet and the World Wide Web, these portable computing devices rely upon access to communication networks in order to support applications they host. For the example of wireless portable computing devices, which use wireless communication standards to establish a connection to a communication network, the need to adapt to changing conditions is especially great. Though the examples in this disclosure will be directed to wireless portable devices, it is recognized that the need for adapting a communication network to varying conditions applies equally well to non-portable wireless devices and to wired communication networks used by any of a variety of devices including, but not limited to: personal computers (e.g., desktops and laptops), supercomputers, networked storage devices, and network hardware (e.g., switches and routers).

One condition that may vary widely for wireless portable devices is the distance of the wireless device from the device with which it has established a wireless connection. When wireless devices are within a relatively small distance of each other, the strength of the signal is typically very strong, and can often drown out interference from other radio frequency ("RF") sources. As the distance between the wireless devices increases, the strength of the signal drops off significantly until a distance is reached at which the communication standard can no longer function.

The often unpredictable introduction of sources of interference is another condition that may vary widely and which has a strong influence on the utility of the communication standard in the given environment. While it is unlikely that any standard can be completely immune to interference, some fare far better in a given environment than others.

The common practice of adhering to a given standard in all conditions is inherently inefficient. The magnitude of this inefficiency is dependent upon a variety of factors, which are all based upon how far the actual conditions the wireless devices are operating under deviate from the expected conditions for which the communication standard was intended. Such inefficiency may lead to a variety of undesirable effects such as: greater power consumption than necessary, less than desired throughput, or a complete inability of the system to operate. In a first aspect of the present invention, these undesirable behaviors are, at least partly, overcome by making use of a variety of available communication standards that communicants share in common.

FIG. 1 shows an example of a system having two communicants in direct communication with each other, according to some aspects of the present invention. Two communicants 101 and 112 have communication standard components 104, 105, 106, 113, 114, and 115 implementing particular communication standards. One communicant 101 has been labeled a "client" communicant and the other communicant 112 has been labeled a "server" communicant for the purposes of this discussion. These labels are intended to be strictly notational and are not intended to carry any additional implicit limitations. The same disclaimer applies to the "client" application 102 and "server" application 117.

While shown as separate components for clarity, it is understood that the communication standard components (e.g., 104, 105, and 106) for a given communicant (e.g., 101) can share common resources (e.g., hardware or software). For example, the various components may be implemented by a single software-defined radio ("SDR") capable of reconfiguring itself to support a variety of communicant standards, but only having a single RF front-end for receiving and transmitting data. Thus, when the various communication standards are implemented using common components, their simultaneous use may be impractical or impossible. However, when implemented without sharing common resources, the various communication standard components for a given communicant may be used concurrently, provided they do not interfere with each other's operation. It is also important to note that, though each communication standard component is shown as implementing separate communication standard, this is not a requirement of this aspect of the present invention. When, for example, two or more communication standard components implement a same communication standard, do not share common resources, and do not appreciably interfere with each other, they may be used concurrently to transmit data.

For this example, each communicant supports Bluetooth®, wireless Ethernet (e.g., 802.11b™), and General Packet Radio Service ("GPRS"). These communication standards are meant only to serve as examples of standards that such a system may support and is not intended to be viewed as limiting the scope of the invention to only these illustrated communication standards. Furthermore, while it is shown that both communicants support exactly the same set of communication standards, this is not a requirement. This aspect of the invention only requires the communicants to share at least one compatible implementation of a communication standard in common, and each communicant may support additional standards which the other communicant does not support. Finally, though each of the example communication standards are wireless communication standards, it is again noted that the scope of the invention should not be limited only to wireless communication standards or to the use of a wireless medium for data transmission. Other media for establishing a connection between a client communicant and a server communicant apply equally well, including glass fiber and electrically conductive material such as copper wire.

Each communication standard shared in common between the communicants may, when the components implementing the standards are properly configured, be used to establish a communication channel 108, 109, or 110 between each communicant 101 and 102. As stated earlier, these communication channels may or may not be usable concurrently depending on the exact physical implementation of the system. Data originating from a client application 102 hosted by the client communicant 101 is sent to a connection selector 103. The connection selector then selectively routes the data to one or more of the communication standard components 104, 105, 106 which have established, or are capable of establishing, a connection, via a communication channel, to the server communicant 112. The communication standard components which have received data from the connection selector 103 then send the received data across their respective communication channels to the server communicant 112.

The connection selector 103 may choose to select a single communication standard component (e.g., 104) for transmitting data received by the client application 102, or may select a combination of communicant standard components, provided the selected combination can properly operate concurrently. There are many conceivable reasons for using multiple communication standards concurrently to transmit data. One example is when higher bandwidth is needed than a single communication standard can provide. In the case where bandwidth is a high priority, the data sent from the client application 102, can be divided and sent concurrently to the chosen communication standard components by the connection selector 103.

In another example, there may be a strong need for very reliable communications in which few retransmissions of data occur or are disallowed altogether (e.g. streaming near real-time data). In the case where reliability is of the utmost importance, the connection selector 103 can send multiple copies of the data across the chosen communication standard components. Thus, even if one communication channel (e.g., 108) is affected by a burst of interference, another communication channel (e.g., 109) might have been successful in sending the data. Thus, no resending of the data is likely to be necessary. In many common cases, however, where the client application 102 does not have a need for high bandwidth or reliability, the use of multiple communication standards to transmit data may simply be a waste of power. Therefore, for many common client applications, the task of the connection selector 103 turns to that of selecting the best of the communication standards for the needs of the client application and the current conditions.

The communicants 101 and 112 do not operate in a perfect communication environment. They are separated by a distance 111, which may be highly variable. As previously disclosed, the distance 111 effects the strength of the signal sent by the client communicant 101 and received by the server communicant 112 (and vice versa). Furthermore, there is a factor of interference 107, which may vary both across time and frequency. Because different communication standards often provide widely varying approaches to transmitting data, and may make use of separate transmission media for doing so, one standard may be far superior to another for transmitting data under a particular set of conditions.

The connection selector 103 can make use of a variety of information in deciding which communication standard component or set of communication standard components to use. The application 102, or a user, may explicitly provide to the connection selector 103 information about the application's bandwidth requirements. In the absence of such explicit information about bandwidth requirements, the connection selector 103 can monitor the bandwidth utilization of the application 102 and make its own one-time or periodic determinations of the bandwidth requirements of the application 102. Additionally, the connection selector 103 or 116 may also receive data from the communication standard components 104, 105, and 106 or 113, 114, and 115 regarding conditions of the respective communication channels 108, 109, and 110. This data may include the current strength of the received signal, number of requests for data to be re-sent (possibly as a result of corruption caused by interference) within a window of time, the average effective bandwidth of the channel over a period of time, and any other data useful in determining the quality of the communication channel.

In addition to collecting statistics about data sent from the client application 102 across the communication channels 108, 109, and 110, the connection selector can periodically send test data across one or more of the channels to measure the relative performance of each communication standard under the current conditions. Based upon the needs of the client application, the connection selector can then select the most efficient set of one or more communication standard components (e.g., in terms of power usage, latency, bandwidth requirements, etc.) necessary to meet the needs.

If it is deemed undesirable to periodically send additional test data across the communication channels (perhaps as a result of bandwidth or power usage concerns), an ordered list (not shown) of the communication standards from the most desirable to the least desirable can be provided to the connection selector 103. This list may be provided by a user or any other means. When data sent from the communication standard components to the connection selector indicates that the channel conditions are deteriorating, or are expected to deteriorate, to an unacceptable level (e.g., as determined by a pre-determined level specified in the ordered list or a level below that of the level needed by the application), the connection selector 103 then may attempt to use the next most desirable communication standard. Upon exhausting all individual communication standards to no avail, or by some planning process, the connection selector 103 may also try using combinations of communication standards which may be used concurrently.

When multiple communication standards are available, the selection of the use of a particular communication standard can be based upon a cost model, where the cost of the communication is continuously, or periodically, assessed and minimized by the selection and configuration of the particular communication standard. Costs may be calculated using a variety of data such as spectrum efficiency, spectrum costs (e.g., for licensed versus unlicensed spectra), power consumption, and quality of service measures such as throughput and delay. The calculated cost may vary depending upon the environment, location, and current application requirements. Applications requirements can vary dramatically. For example a streaming multimedia application may require a high-bandwidth, high quality, one-way link, whereas a telephony application may require a bi-direction, real-time link. Furthermore, the needs of a single application may vary widely over time as the usage pattern of the application evolves. In some aspects of the present invention, the selection of a communication standard by a communication selector should represent the optimal choice of a communication standard given the available options. When making an optimal selection is not possible, or infeasible, heuristic approximations yielding good results may be used.

Data, after being sent across one or more communication channels from the client communicant 101 to the server communicant 112, is received by a set of corresponding communication standard components 113, 114, and 115. The data is then sent to a connection selector 116. In a common case, where only one communication standard is used at a given time, the data is sent from the receiving communication standard component (e.g., 113) and sent to a communication selector 116, which sends the data to a server application 117 for processing. For the (higher bandwidth) case where data has been divided and sent using multiple communication standards, the connection selector 116 reassembles the data and sends it to a server application 117. Finally, when identical data is sent along multiple communication standards concurrently (for redundancy), the connection selector 116 merges the multiple copies of the incoming data and sends a complete, non-redundant copy of the data to a server application 117.

Once the server application 117 has processed the incoming data, the response is sent back through the connection selector 116, through the appropriate set of communication standard components 113, 114, 115, over the corresponding communication channels 108, 109, 110, to the client communicant, where a similar process to the one above is performed.

It is noted that, for both the client communicant and the server communicant to properly communicate with each other, the changes made by either of the connection selectors 103 or 116 must be communicated to the other. This can be accomplished in a variety of ways including sending the updates through the same communication standard as the data or sending the updates through a special communication standard dedicated to that function. Both the client communicant 101 and the server communicant 112 may initially identify each other (e.g., upon coming within range of each other) either by rendezvousing a preset/pre-agreed upon communication standard, or by using a discovery protocol such as periodically sending identification data using each supported communication standard. The discovery protocol may also be used to aid each communicant in discovering the supported communication standards of the other communicant. Once an initial connection is established, each may send updates to the other to signal a desire to change the communication standard(s) being used.

The connection selector and discovery protocol together can be used to facilitate the transition between the use of a first set of one or more communication standards and a second set of one or more communication standards when it is determined that the second set is preferable to the first as determined by a cost calculation. This facilitated transition may appear to communicating applications to be seamless. One attribute of a connection selector that may be useful in providing this functionality include the ability to buffer the data being sent between the applications while the transition is taking place. The connection selector may also provide a consistent interface to the variety of communication standards from the perspective of the communicating application.

To allow for a smooth transition, an adaptive mechanism may be deployed. If it is determined that a second communication standard is better suited than a first communication standard currently being used (e.g., as a result of changes in interference and network topology), the adaptive mechanism determines the time necessary to make the transition from the first standard to the second standard (which may be small if both standards may be used simultaneously) before transitioning from the first standard to the second standard. Additionally, both standards may be used concurrently if deemed desirable and may be used to establish communication links with different properties. For example, a fast link may be used for one-way multimedia streaming which a second, slower link may be used for sending control data.

In another aspect of the present invention, the connection selectors 103 and 116 also communicate configuration information to the communication standard components 104, 105, 106, 113, 114, and 115. This configuration information can specify parameters for making dynamic adjustments to elements of the communication standards. As started earlier, communication standards comprise a set of one or more protocols for performing all of the tasks necessary to communicate. Such tasks typically include: representing data, signaling, authenticating, and detecting and correcting errors. The design of each of these protocols affects the behavior and capabilities of each of the communication standards. Typical elements of protocols that may be parameterized include the order of modulation and forward error correction among many others.

If the previously disclosed measurements of the channel conditions show that the received signal is relatively strong and there is little external interference, it may be beneficial to use a forward error correction scheme which provides less redundancy and ability to correct errors. Such a change to a less robust forward error correction scheme has a result of allowing for greater throughput when channel conditions are favorable. In another example, the modulation scheme used may be modified based upon channel conditions. If a given communication standard is defined to use quadrature amplitude modulation ("QAM") with 64 symbols, but the channel conditions may support 256 symbols, it may be desirable to reconfigure the modulation scheme for 256 QAM, allowing for greater throughput on the channel. On the other hand, downgrading the number of symbols used when channel conditions are deteriorating may extend the range of the communication channel at the cost of throughput.

Such parameterized changes, however, may not be supported by the established communication standard. Thus, an implementation of a communication standard by a communication standard component may include operating modes which are not supported by the standard. Such modes of operation can therefore only be supported when all communicants implementing compatible parameterized communication standard components. As stated before, for the communicants to continue to be able to communicate, it will be necessary for configuration information to be passed between them to allow for dynamic reconfiguration of the communication standard components by the connection selectors 103 and 116.

The communication selector 103 or 116 may choose to vary the parameters used by a given communication standard component (e.g., 104) before attempting to use another communication standard component (e.g., 105) as disclosed in the prior aspect of the present invention. The communication standard components can notify the connection selector of their available parameters in a variety of ways including configuration files and discovery protocols.

Figure 2:
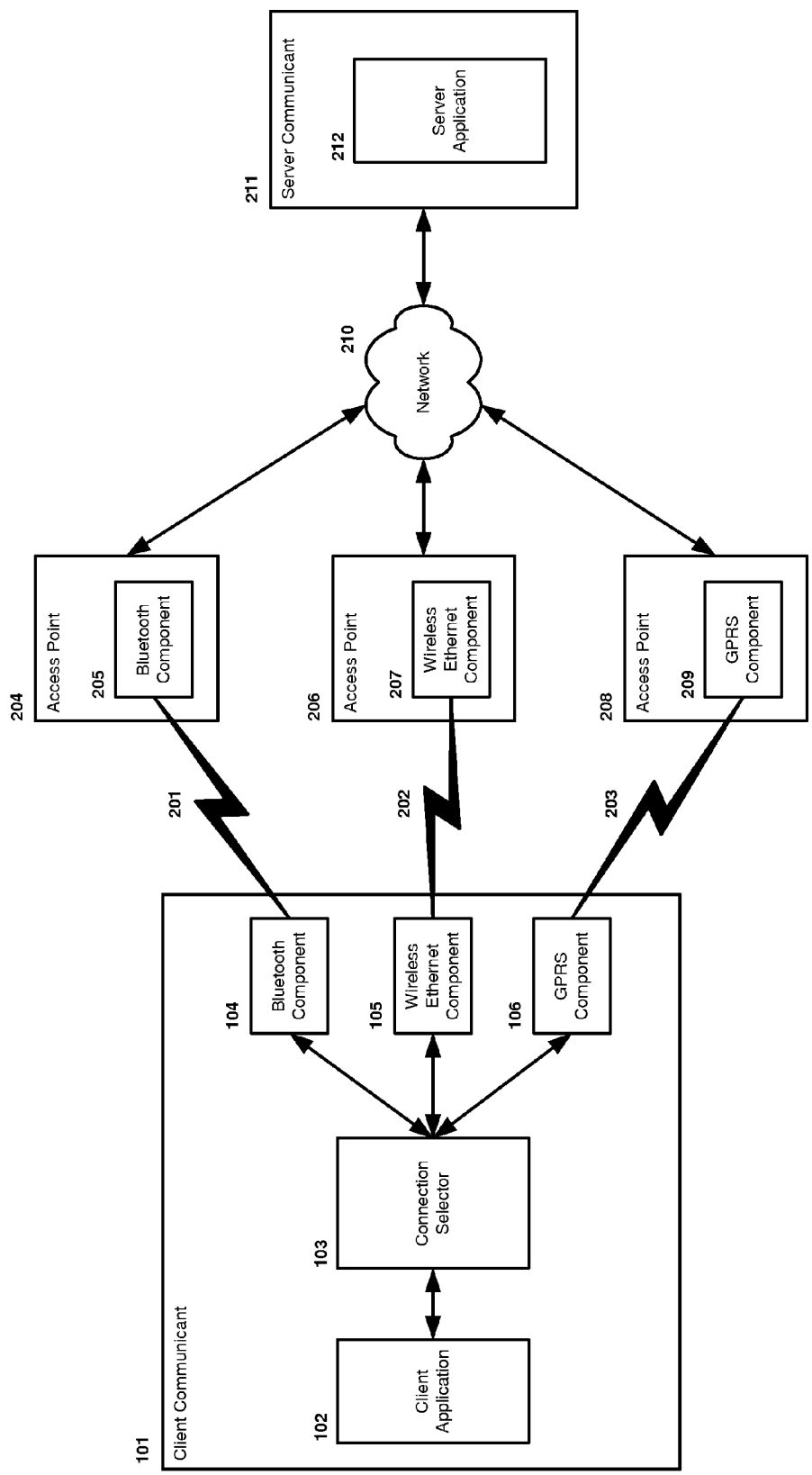
FIG. 2 shows an example of a system having two communicants connected via a single-standard access point, according to some aspects of the present invention.

FIG. 2 shows an example of a system having two communicants connected via a single-standard access point, according to some aspects of the present invention. In this system, the client communicant 101 and is internal components 102, 103, 104, 105, and 106 all function as previously disclosed. Rather than implementing a communicant-to-communicant system, however, the system in FIG. 2 allows for the client communicant 101 to indirectly establish a connection to a server application 212 hosted by a remote server communicant 211. The indirect connection is established via one or more available access points 204, 205, and 206 across respective communication channels 201, 202, and 203. Each access point has a communication standard component 205, 207, and 209 implementing a particular communication standard. Each access point then connects via a network 210 to the server communicant 211.

The communication standard (not shown) used by the access points to communicate with the server communicate with the server communicant 211 can differ from that used to communicant with the client communicant. Thus, the access points can each be used to provide the client communicant 101 access to the server communicant 211 using one or more of its supported communication standards 104, 105, and 106 though the network 210 and the server communicant 211 may not recognize or support those communication standards supported by the client communicant 101. The benefits of such a system include the ability for the connection selector 103 to dynamically choose the use of one or more access points.

Figure 3:
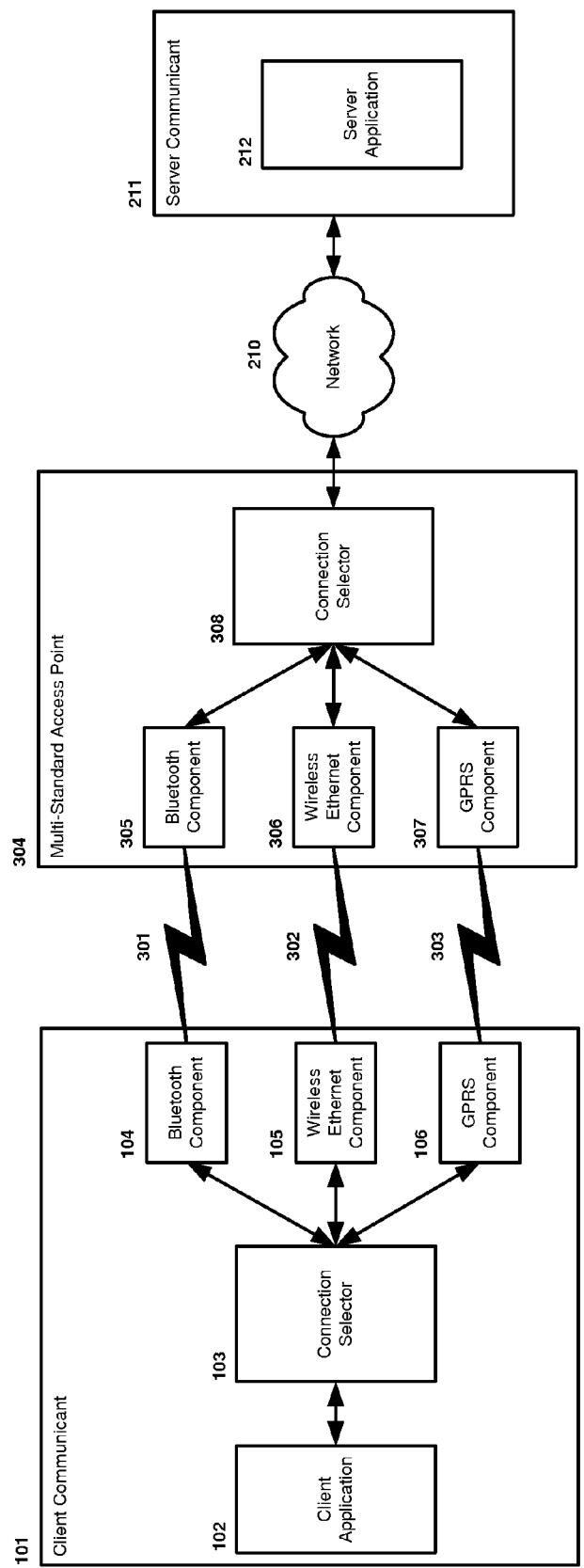
FIG. 3 shows an example of a system having two communicants connected via a multi-standard access point, according to some aspects of the present invention.

FIG. 3 shows an example of a system having two communicants connected via a multi-standard access point, according to some aspects of the present invention. While having many of the same features of the system of FIG. 2, the system in FIG. 3 illustrates a multi-standard access point which is capable of communicating with a client communicant 101 using a variety of communication standards 104, 105, 106, 305, 306, and 307 over their respective communication channels 301, 302, and 204. The multi-standard access point 304 may then communicate over a network 210, potentially using a different communication standard (not shown) than the one used to communicate with the client communicant 101, to a server communicant 211. As with the other example systems disclosed, this system provides end-to-end communication between the client application 102 and the server application 212.

The connection selector 308 in the multi-standard access point 304 permits the communication between the client communicant 101 and the multi-standard access point 304 to have all the benefits disclosed in the discussion of FIG. 1. These benefits include the ability to send data in parallel (for redundancy or to increase throughput), where supported by the communication standards. The communication standard component parameters can also be dynamically modified in a way that provides greater efficiency than supported by a standard implementation of a communication protocol. That is, the communication standard components in both the multi-standard access point and the client communicant, when supporting the same configurable parameters, can be tuned to dynamically provide a broader range of communication options than would otherwise be supported. A variety of application profiles may then be supported including those which can specify a desire to optimize data integrity, throughput, power consumption, and range. The use of multiple multi-standard access points is also conceivable, adding even further support for adapting the communication network to changing conditions.

Figure 4:
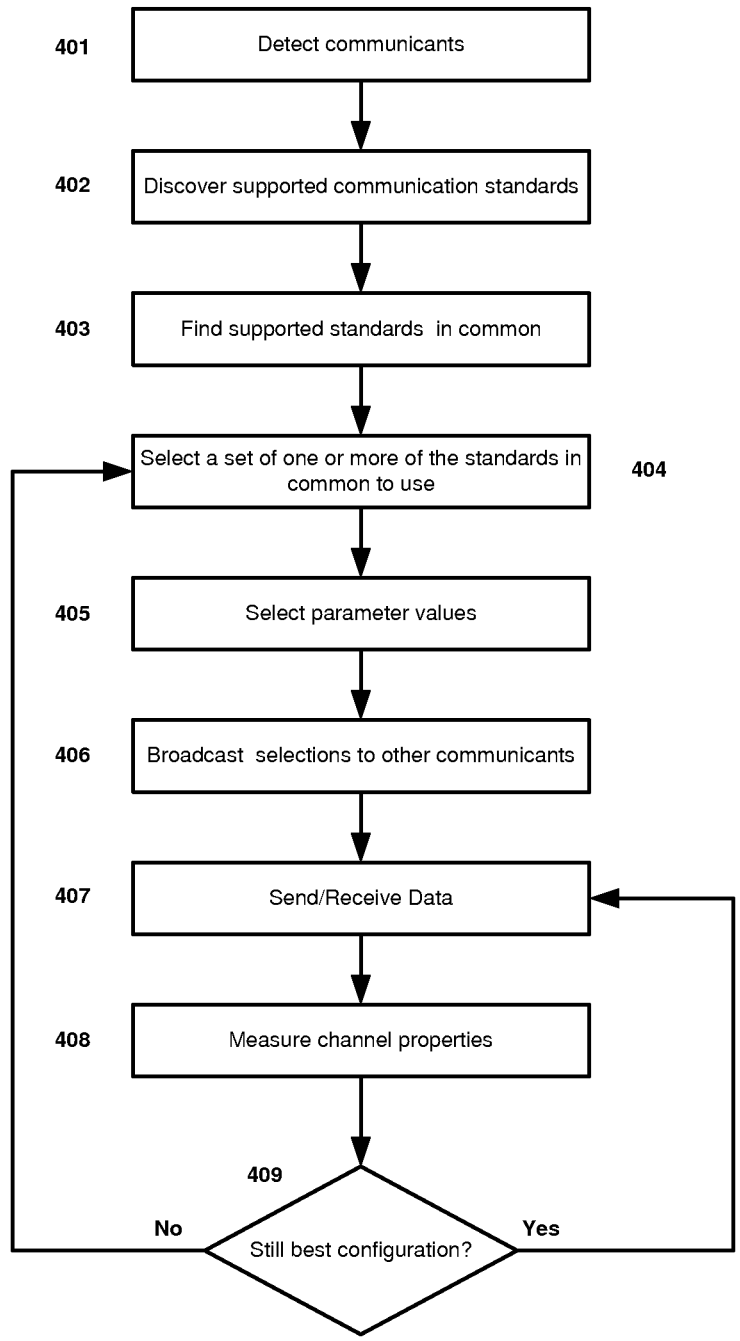
FIG. 4 shows a process diagram for adapting a network to changing conditions, according to some aspects of the present invention.

FIG. 4 shows a process diagram for adapting a network to changing conditions, according to some aspects of the present invention. The steps shown in FIG. 4 are performed by an arbitrary communicant operating as disclosed in prior discussion. In step 401, a communicant detects the other communicants with which it can communicate. As disclosed previously, this may be done in a variety of ways including through the use of a discovery protocol operating over a pre-determined communication standard. Additionally, the communicant can use the discovery protocol for each of the communication standards which it supports, or rely upon some form of manual configuration.

Once the communicants with which the given communicant can communicate have been discovered, information for determining all of the communication standards supported by each of the communicants is discovered in step 402. This information is then used in step 403 to determine the set of standards which the communicants share in common. Step 403 may also be used to determine the (potential non-standard) parameters, as previously described, supported by each of the communication standard implementations. Only the communication standards and parameters which are common to the communicants are used for communication.

In step 404, an initial set of one or more communication standards is chosen. As was disclosed earlier, this selection may be determined by user preferences or by monitoring application needs and channel properties. If data is to be sent using multiple communication standard components, the decision about whether the data should be sent redundantly (i.e., a copy of the data sent across each chosen standard) or to maximize throughput (i.e., a different portion of the data sent across each chosen standard) is also made in this step. In step 405, any (non-default) parameter values are selected. Such selections of communication standards and parameter values may be made to optimize quantities according to profiles such as minimal power usage, maximum bandwidth, and maximum reliability as dictated by the application or user preferences.

In step 406, the decisions and selections made in steps 404 and 405 are broadcast to the other communicants so that they can synchronize their settings to match. This may be done using the same channel that was used to acquire the information of steps 401 and 402. The other communicants may then reply to confirm that the changes have been made and that they are configured to begin communicating data. In step 407, applications hosted by the communicants send and receive data. Periodically, in step 408, the communicant measures the properties of the channel (and also the requirements of the application) to determine if the conditions have changed enough to warrant a change in the communication configuration, which is decided in step 409. If it is determined that the current configuration may not be the best configuration for the current conditions, step 404 is revisited and a new set of communication standards and/or parameter values may be chosen. Otherwise, if it is determined that the current configuration is the best configuration for the given conditions, step 407 is revisited and more data is sent and/or received using the same configuration.

The systems and methods disclosed herein provide the ability to adapt a communication network to varying conditions by coordinating the many distinct communication standards that may be supported for different purposes on a given communicant for a common purpose. Furthermore, by allowing parameterization of aspects of the communication standard in potentially non-standard ways, a more adaptive communication standard can be realized. By further combining these two powerful ideas in a variety of ways, a rich set of adaptive communication systems ensue which make use of all their resources to provide a robust communication mechanism for applications they support. The resulting communication mechanism may allow communication under conditions that would render any given single communication standard useless and provide far greater ability to dynamically support changing factors such as distance and interference, as well as requirements on throughput and data reliability.

What is claimed is:

1. A method performed on a first communication device, the method comprising:
   measuring relative performance of at least one communication standard under conditions between the first communication device and a second communication device; where the measuring comprises determining an average bandwidth over a period of time;
   sending, by the first communication device, to the second communication device an indication of the at least one communication standard along with various parameters supported by the indicated at least one communication standard;
   establishing, by the first communication device in conjunction with the second communication device, a communication configuration that includes a channel between the first communication device and the second communication device in accordance with one of the sent at least one communication standard and corresponding parameters of the sent various parameters;
   optimizing the corresponding parameters of the established communication configuration according to a profile, the optimizing comprising detecting current conditions associated with the established communication configuration and adjusting the corresponding parameters based on the detecting, where the profile is selected from profiles including a minimal power usage profile, a maximum bandwidth profile, and a maximum reliability profile; and
   repeating the sending and the establishing in response to the detecting the current conditions associated with the established communication configuration, the repeating resulting in a new established communication configuration that is better in view of the current conditions than the established communication configuration.

2. The method of claim 1 where the repeating is in response to the current conditions deteriorating to an unacceptable level.

3. The method of claim 1 where the repeating is in response to the current conditions being expected to deteriorate to an unacceptable level.

4. The method of claim 1 where the measuring further comprises determining a signal strength.

5. The method of claim 1 further comprising selecting, based on the measuring, the one of the sent at least one communication standard and the corresponding parameters of the sent various parameters.

6. The method of claim 1 further comprising broadcasting the optimized parameters to the second communication device.

7. The method of claim 1 where the detecting further comprises detecting requirements of an application.

8. A method performed on a first communication device, the method comprising:
   receiving, by the first communication device from a second communication device, an indication of at least one communication standard and various parameters supported by the at least one communication standard;
   measuring relative performance of the at least one communication standard under conditions between the first communication device and the second communication device; where the measuring comprises determining an average bandwidth over a period of time;

establishing, by the first communication device in conjunction with the second communication device, a communication configuration that includes a channel between the first communication device and the second communication device in accordance with one of the received at least one communication standard and corresponding parameters of the received various parameters;

optimizing the corresponding parameters of the established communication configuration according to a profile, the optimizing comprising detecting current conditions associated with the established communication configuration and adjusting the corresponding parameters based on the detecting, where the profile is selected from profiles including a minimal power usage profile, a maximum bandwidth profile, and a maximum reliability profile; and repeating the receiving and the establishing in response to the detecting the current conditions associated with the established communication configuration, the repeating resulting in a new established communication configuration that is better in view of the current conditions than the established communication configuration.

9. The method of claim 8 where the repeating is in response to the current conditions deteriorating to an unacceptable level.

10. The method of claim 8 where the repeating is in response to the current conditions being expected to deteriorate to an unacceptable level.

11. The method of claim 8 where the measuring further comprises determining a signal strength.

12. The method of claim 8 further comprising selecting, based on the measuring, the one of the at least one communication standard and the corresponding parameters of the sent various parameters.

13. The method of claim 8 further comprising broadcasting the optimized parameters to the second communication device.

14. The method of claim 8 where the detecting further comprises detecting requirements of an application.

15. A system comprising a first communication device and at least one component that are together configured for causing the system to perform actions comprising:

receiving, by the first communication device from a second communication device an indication of at least one communication standard and various parameters supported by the at least one communication standard;

measuring relative performance of the at least one communication standard under conditions between the first communication device and the second communication device; where the measuring comprises determining an average bandwidth over a period of time;

establishing, by the first communication device in conjunction with the second communication device, a communication configuration that includes a channel between the first communication device and the second communication device in accordance with one of the received at least one communication standard and corresponding parameters of the received various parameters;

optimizing the corresponding parameters of the established communication configuration according to a profile, the optimizing comprising detecting current conditions associated with the established communication configuration and adjusting the corresponding parameters based on the detecting, where the profile is selected from profiles including a minimal power usage profile, a maximum bandwidth profile, and a maximum reliability profile; and repeating the receiving and the establishing in response to the detecting the current conditions associated with the established communication configuration, the repeating resulting in a new established communication configuration that is better in view of the current conditions than the established communication configuration.

16. The system of claim 15 where the repeating is in response to the current conditions deteriorating to an unacceptable level.

17. The system of claim 15 where the repeating is in response to the current conditions being expected to deteriorate to an unacceptable level.

18. The system of claim 15 where the measuring further comprises determining a signal strength.

19. The system of claim 15, the actions further comprising selecting, based on the measuring, the one of the at least one communication standard and the corresponding parameters of the sent various parameters.

20. The method of claim 15 where the method further comprises broadcasting the optimized parameters to the second communication device, or where the detecting further comprises detecting requirements of an application.

* * * * *